(12) United States Patent
Achten et al.

(10) Patent No.: US 9,040,438 B2
(45) Date of Patent: May 26, 2015

(54) LOW-VISCOSITY AQUEOUS ADHESIVE POLYMER DISPERSIONS

(75) Inventors: Dirk Achten, Köln (DE); Peter Kueker, Bergisch Gladbach (DE); Juergen Kempkes, Köln (DE); Bianka Lorenz, Dormagen (DE); Peter Reichert, Dormagen (DE); Winfried Jeske, Burscheid (DE); Jose Colinas-Martinez, Wermelskirchen (DE)

(73) Assignee: Bayer MaterialScience AG (DE)

( * ) Notice: Subject to any disclaimer, the term of this patent is extended or adjusted under 35 U.S.C. 154(b) by 1611 days.

(21) Appl. No.: 12/193,832

(22) Filed: Aug. 19, 2008

(65) Prior Publication Data
US 2009/0053949 A1 Feb. 26, 2009

(30) Foreign Application Priority Data
Aug. 24, 2007 (DE) .......................... 10 2007 040 277
Feb. 14, 2008 (DE) .......................... 10 2008 009 390

(51) Int. Cl.
*C09J 111/02* (2006.01)
*C08K 3/36* (2006.01)
*C08L 11/02* (2006.01)
*C08K 3/26* (2006.01)

(52) U.S. Cl.
CPC ................. *C09J 111/02* (2013.01); *C08K 3/26* (2013.01); *C08K 3/36* (2013.01); *C08L 11/02* (2013.01)

(58) Field of Classification Search
USPC ................. 442/149, 181, 304, 327; 156/333; 428/441, 462, 511, 519
See application file for complete search history.

(56) References Cited

U.S. PATENT DOCUMENTS

| | | | |
|---|---|---|---|
| 2,234,215 | A | 3/1941 | Youker |
| 3,397,173 | A | 8/1968 | Collette et al. |
| 3,422,045 | A | 1/1969 | Aho |
| 3,929,752 | A | 12/1975 | Cooper et al. |
| 3,932,355 | A | 1/1976 | Barney et al. |
| 4,124,754 | A | 11/1978 | Miller |
| 4,704,441 | A | 11/1987 | Musch |
| 4,992,481 | A | 2/1991 | von Bonin et al. |
| 6,319,352 | B1 | 11/2001 | Simmler et al. |
| 6,440,259 | B1 | 8/2002 | Patel |
| 7,148,277 | B2 | 12/2006 | Grabowski et al. |
| 2003/0221778 | A1 | 12/2003 | Musch et al. |
| 2006/0115642 | A1* | 6/2006 | Musch et al. .............. 428/294.7 |

FOREIGN PATENT DOCUMENTS

| | | |
|---|---|---|
| AU | 46369/72 A | 3/1974 |
| DE | 1271405 | 6/1968 |
| DE | 1301502 | 8/1969 |
| DE | 2246012 A | 7/1973 |
| DE | 2307811 | 9/1973 |
| DE | 2514666 A1 | 10/1975 |
| DE | 2527320 A1 | 1/1976 |
| DE | 2650714 A1 | 5/1978 |
| DE | 2755074 A1 | 6/1978 |
| DE | 3246748 A1 | 6/1984 |
| EP | 0332928 A2 | 9/1989 |
| EP | 0624634 A1 | 11/1994 |
| EP | 1624018 A1 | 2/2006 |
| EP | 1852879 A1 | 5/2006 |
| GB | 1414393 | 11/1975 |
| GB | 1518229 | 7/1978 |
| JP | 60-031510 A | 2/1985 |
| WO | WO-01/34718 A1 | 5/2001 |
| WO | WO-2004/106422 A1 | 12/2004 |
| WO | WO-2008/037704 A1 | 4/2008 |

* cited by examiner

*Primary Examiner* — Lynda Salvatore
(74) *Attorney, Agent, or Firm* — Drinker Biddle & Reath LLP

(57) ABSTRACT

The invention relates to low-viscosity, low-monomer aqueous polymer dispersions based on polychloroprene, and a process for the preparation thereof and the use thereof as a contact adhesive.

20 Claims, No Drawings

LOW-VISCOSITY AQUEOUS ADHESIVE POLYMER DISPERSIONS

RELATED APPLICATIONS

This application claims benefit to German Patent Application No. 10 2008 009 390.4, filed Feb. 14, 2008, which is incorporated herein by reference in its entirety for all useful purposes. This application also claims benefit to German Patent Application No. 10 2007 040 277.7, filed Aug. 24, 2007.

BACKGROUND OF THE INVENTION

The invention relates to low-viscosity, low-monomer aqueous polymer dispersions based on polychloroprene and to a process for the preparation thereof and the use thereof as a contact adhesive.

The usual contact adhesives of the prior art based on polychloroprene, styrene/butadiene/styrene block copolymers or polyurethanes are predominantly solvent-containing adhesives which are applied to both substrates to be joined and are dried. After drying in air and subsequent joining of the two substrates under pressure, a joint structure having a high initial strength is obtained directly after the joining operation. If required, subsequent further physical and/or chemical crosslinking reactions increase the join strength. The adhesive formulations available on the market which are employed in this way have solids concentrations of organic components, comprising polymers, resins, plasticizers, anti-ageing agents and further conventional formulation auxiliaries, of from 10 to 25 wt. %, inorganic constituents, such as salts and fillers, of from 0 to 25 wt. % and solvent components of from 65 to 90 wt. %.

For ecological, economic and work safety and hygiene reasons, there is a growing demand for suitable aqueous dispersions which can be processed to corresponding solvent-free adhesive formulations.

Solvent-free contact adhesive formulations based on polychloroprene and, to a limited extent, natural rubber latex are prior art. Both are distinguished in that—analogously to solvent-containing contact adhesives—they are typically applied to both sides of the substrate. After a minimum drying or air-drying time specific for each of the formulations, during which excess water vaporizes/evaporates, the substrates are joined or pressed together, the adhesive film crystallizing under pressure or shear forces and a high initial strength being generated in this manner. Thereafter, analogously to the solvent-containing contact adhesives, further chemical and/or physical processes can be used to improve the joint strength. The usual variants here are, for example, post-crosslinking via blocked or latently reactive isocyanates and the use of suitable resins as formulation constituents.

A disadvantage of solvent-free aqueous contact adhesive formulations which is often mentioned, compared with solvent-containing contact adhesives, is the longer time span necessary to achieve, by evaporation/vaporization of the water, a concentration of the solids content of the joint component surfaces sufficient for film formation. A high initial solids concentration reduces the time until film formation of the adhesive dispersion on the joint components and therefore the waiting time until successful bonding by contacting of the joint components.

The lower initial strength, compared with solvent-containing systems, directly after the joining operation because of water enclosed in the adhesive film is mentioned as a further disadvantage.

To solve these problems, the prior art recommends adjusting aqueous adhesive formulations to a solids content which is as high as possible. The highest possible solids concentrations in the polychloroprene lattices employed are accordingly desirable for use as contact adhesives. For this reason, polychloroprene lattices which have proved suitable for adhesive uses are available on the market only with a solids concentration of greater than 40 wt. %. The possible solids concentration is limited purely physically by the densest particle packing of the lattices. The usual polychloroprene lattices have solids (polychloroprene) contents in the range of from 50 to 60 wt. %.

A desirable wet-in-wet bonding, which is defined as direct joining and bonding after application of the aqueous adhesive formulation, can be achieved by application of the adhesive by a 1- to 2-component process. In this context, lattices of the highest possible concentration are successfully employed (solids content >50 wt. %).

In a 1-component process, the adhesive formulation is adjusted by additional destabilization of the latex with electrolytes and/or lowering of the pH such that it breaks (forms a film) directly after application to the substrate and can be pressed or bonded.

For this purpose, in the prior art preferably anionic polychloroprene lattices stabilized via resin acids or disproportionated resin acids are destabilized with the aid of monovalent and/or divalent inorganic salts, such as, for example, KCl, NaCl, $ZnCl_2$, $MgCl_2$, ZnO, MgO and/or by inorganic and/or organic acids, such as, for example, HCl, boric acid, phosphoric acid, bicarbonate or acetic acid, glycine, other amino acids, tartaric acid, citric acid, or alkali metal and alkaline earth metal salts thereof, up to a point where they break directly under shear forces or pressure, form a film and can be bonded under pressure.

As described in US-A 2003/221778, increased initial strengths are achieved by the choice of rapidly crystallizing lattices and/or by the use of up to 30 parts of colloidally dissolved silica in combination with polychloroprene latex. Furthermore, diverse other formulation constituents, such as resins, polyurethane, acrylate and SBR lattices, organic solvents and additional oxidation stabilizers, fungicides, bactericides, ionic and nonionic surfactants, further fillers and the usual formulation constituents for aqueous dispersions can also be constituents of the formulation.

At solids concentrations of the adhesive formulations of greater than 45 wt. %, the formulations are reactive and high-viscosity formulations. Consequently, wet-in-wet bonding is faster, but with the disadvantage of a poorer storage/HCl and shear stability of the formulations.

WO 01/34718 discloses solids concentrations of below 35 wt. %. However, these polychloroprene lattices comprise acrylic acid esters or ethylvinyl acetate or colophony resin dispersions in combination with boric acid or amino acid or organic acid.

Formulation of adhesives which can be applied by the 2-component process is furthermore prior art. These adhesives are conventionally composed of an anionically stabilized polychloroprene latex and an activating component. By storing the activating component separately, on the one hand a high storage stability of the formulated polychloroprene latex component and on the other hand a high reactivity (rapid breaking of the adhesive formulation after application to the substrates) and as a result outstanding wet-in-wet adhesive properties after the components are combined are achieved. As an embodiment variant of this process, there is the possibility of application of the adhesive to the joint components by the "spray mix" process. In this process, the adhesive and a coagulating agent are conveyed separately into a spray gun, mixed in the spray jet and coagulated while still in flight and/or on the joint component. The viscosity of the latex component is adjusted here to viscosities of between 200-3,000 mPas, as is typical for application of contact adhesives by means of spray processes. In this context, concentrated aqueous solutions of alkali metal and/or alkaline earth metal ions and/or e.g. trivalent aluminium ions and/or inorganic/organic acids can serve as the activating component.

Disadvantages of this process are the high expenditure on apparatus, the mixing process, which is susceptible to error, and the typically high ion concentrations in the resulting adhesives, which lead to increased swelling with water of equilibrium or—in the case where acids are employed—to corrosion in connection with metallic substrates if low pH values are established. The process is comparatively time- and cost-intensive and is therefore unsatisfactory from the economic aspect.

All anionic commercially available polychloroprene dispersions stabilized with resin acids (or derivatives thereof, such as, for example, disproportionated resin acids or specific resin acid distillation cuts) split off significant amounts of HCl in the course of the storage time specified. In the case of ready-formulated, reactive 1-component adhesive formulations, this additional nuisance leads to an additional limitation of the storage stability, because the falling pH additionally destabilizes the formulation.

This problem and resulting possible discolorations of the aged adhesive formulations and/or of the adhesive applied and a possible acid attack by the HC liberated on any pH-sensitive substrates is conventionally solved by addition of divalent predispersed metal oxides (ZnO, MgO, CaO), in some cases present as nanoparticles, and/or aminic acid-trapping agents, such as hydroxylamine, ethanolamine or condensation products and derivatives thereof (WO A1 2004/106422). Anti-ageing agents against oxidative ageing are furthermore added.

The use of polyvalent metal oxides, such as MgO and CaO, is not desirable in anionic polychloroprene dispersions stabilized with resin acids, because the latex is destabilized. Concentrations higher than 0.24% of ZnO are subject to labelling in various countries and make the preparation of stable adhesive formulations having a pH of less than 10 considerably more difficult because of their amphoteric character.

Such formulations typically show only a short storage stability, especially in low-viscosity formulations, because of coagulation. In contrast, more highly viscous, for example paste-like formulations facilitate formulation of storage-stable systems, but greater changes in viscosity over the storage time are furthermore typical (increase by a factor of >2). Both variants, a stabilization via ions and also via the aminic stabilizers mentioned, are not advantageous for the swelling in water and the ecobalance. Thus, for example ZnO in concentrations of greater than 0.24 wt. % is classified as environmentally harmful, and all volatile organic constituents increase the TVOC (total volatile organic concentration) values of a formulation and therefore limit the use in applications with strict environment or fogging regulations.

In order to improve still further the adhesive properties and application properties (film formation) by means of a brush, roller or in the spray process, contact adhesive formulations are often adjusted to viscosities of 200-3,000 mPas for spray application and to 1,000-10,000 mPas for brush or roller application. This is conventionally effected by means of the usual thickeners, such as water-soluble polyurethanes, polyacrylic acids, polyols, cellulose/starch/sugar derivatives or polyacrylamides. In the case of colloidally dissolved or suspended silicas, this is effected by means of mono/divalent ions usually based on ZnO and by pH adjustment of the formulations to a value in the transition range of the colloidal stability of the aqueous silica solution/suspension (US-A 2003/221778). Since the viscosity of adhesive formulations thickened in such a manner is extremely pH-dependent, a long-term stability of the viscosity cannot be achieved in practice because of the progressive splitting off of HCl on the polychloroprene.

A serious disadvantage of the viscous and destabilized or activated formulations established in this way is in turn the often deficient storage, viscosity and shear stability, which easily leads to skin formation on the surface of the adhesive and to regular deposits, specks and lumps in the prepared adhesive formulations due to shear forces during transportation and application. Furthermore, the ecological problems during use of e.g. relatively high concentrations (up to 5 wt. %) of ZnO or boric acid, as described in EP-A 0 624 634 and Health Assessment no. 005/2006 of the BfR of 16 Nov. 2005, are to be noted.

The high solids content of approx. 50 wt. % in aqueous contact adhesive formulations compared with dilute solvent-based contact adhesives with a solids content of approx. 15 wt. % furthermore causes unnecessarily thick application layers of the adhesive. Under certain circumstances, this state of affairs adversely influences both the adhesive properties of the process and the economic characteristic data (material consumption) of the bonding.

Application of the adhesive formulation by means of spray processes is a preferred method for targeted thin application of contact adhesives to substrate surfaces, for example for foam-foam bonding in the furniture and mattress industry, and for uniform industrial wetting of surfaces for lamination in the automobile industry, as well as bonding of woven fabric and of leather. There are again and again problems here with so-called "overspray". This means wetting with adhesive formulation on the other side of the target region and running off of excess spray composition from the substrate sample.

"Overspray" is a complex phenomenon which is partly caused by too low a viscosity of the formulation in relation to the application conditions—nozzle geometries and pressure ratios are to be mentioned here by way of example.

This low viscosity arises partly due to the discrepancy between the preparation viscosity, measured by means of a Brookfield rheometer at 12 or 30 or 60 revolutions/min at room temperature, and the viscosity under extreme shear stresses, such as occur in the usual spray units. The choice of suitable spray conditions for structurally viscous or thixotropic liquids is at best empirical in this manner without expensive measurement methods for the shear-related viscosity and in particular also the latex stability. Accordingly, the quality of the spray result is often deficient, and the amount of overspray is typically considerable. In this connection, repeated malfunctions due to blockages/bondings of the spray head because of the lack of shear stability of commercially available formulations also often occur (Technology for Waterborne Coatings ACS Symposium Series 663 1997 Chapter 15).

The use of silica products for various applications is known from the prior art. While solid $SiO_2$ products are frequently employed for controlling rheological properties, as fillers or adsorbents, in the case of silica sols use as binders for diverse inorganic materials, as polishing agents for semiconductors or as flocculation partners in colloid chemistry reactions dominates. For example, EP-A 0 332 928 discloses the use of polychloroprene lattices in the presence of silica sols as an impregnating layer in the production of fireproofing elements.

US-A 2003/221778 furthermore describes the use of silica/water-glass suspensions for improving the wet tackiness and initial strength and final strength of polychloroprene contact adhesive formulations. Viscosities are moreover adjusted in a targeted manner via silica suspensions with the aid of the pH and mono- and/or divalent ions. The silicas disclosed in US-A 2003/221778 are sensitive to both low pH (<9) and high concentrations of divalent ions/metal oxides (ZnO, MgO). A stable formulation with respect to viscosity and/or latex stability based on polychloroprene latex containing colloidally dissolved silicas at a pH of <9.5 in combination with typical ZnO concentrations to adjust the viscosity and HCl or pH stability is known only in connection with additional auxiliary emulsifiers and/or stabilizing acrylate dispersions (company specification: Sales Aid—1-Component Spray Adhesives based on Dispercoll®C, Bayer MaterialScience June 2007).

According to the prior art, the use of these inorganic fillers in amounts of up to approx. 30 parts by wt., based on the content of solid in the polychloroprene latex, is advantageous. At higher concentrations, in addition to the initial and final strength in the 180° peel test, in combination with ZnO and at a pH of <10, the long-term stability of the formulations falls. At higher concentrations of silica sols, the possibility of stable adjustment of the viscosity by means of the usual thickeners or ZnO additions moreover disappears. An advantageous feature, as described, for use as a typical reinforcing filler and rheology auxiliary therefore already no longer exists at concentrations of from approx. 20 wt. %.

The term high initial strength is closely linked to the definition of a contact adhesive, Contact adhesives in principle can be applied at ambient temperature to substrates with the ambient temperature. A sufficiently high initial strength is to be understood as meaning a strength which is sufficiently high for further processing of joint components, so that slipping of the joined components during the subsequent processing process is avoided, or the bonded substrates having a strength below the adhesive and cohesive strength of the adhesive layer, so that as a rule when the joined object is subjected to load, the joint component is destroyed before the adhesive layer.

Pressure-sensitive adhesives are often also incorrectly called contact adhesives. However, these differ physically in that no immediately starting crystallization takes place in the adhesive layer in the joining process, which is why such bonds in principle creep under load. Typical examples of these are amorphous polyacrylate and polyurethane dispersions, formulations with a glass transition point of the amorphous polymer matrix below the application temperature. A disadvantage here is the creep process referred to, which does not allow permanent joining under load with the aid of such products and often does not achieve the required initial strengths.

Another example of incorrectly named contact adhesives are heat-activatable systems, e.g. so-called hot melts, which must be applied hot, joined immediately, and solidify on the cold joint component surface by crystallization or cooling to below the glass transition point. The necessary use of in some cases high-melting systems with a Tg/temperature of >>80° C. in order to ensure an adequate heat resistance is a disadvantage here. The use of high temperatures often presents problems on sensitive substrates. The user furthermore has to be protected from the high use temperatures. Application of the adhesive over a large area by means of spray systems presents problems because of the rapid solidification of the cohesion layer. Adhesive formulations on a hot melt basis moreover are typically hard and brittle after curing. A deficiency is furthermore derived in the use in comfort systems, such as furniture and mattresses. A sufficiently long open time which allows a flexible joining process also in complex working processes which take various times and a possible repositioning of the bonded elements likewise does not exist or is only inadequate.

Polyurethane-based adhesive dispersions which must first dry off on the substrate surface and form a film before they can be joined together after heat activation are moreover prior art. Latently reactive films/foils which can be laid on the substrate, activated by heat and then applied via pressing also function analogously. Disadvantages of the polyurethane-based products are the lack of wet-in-wet adhesive strength and the fact that application to vertical surfaces is ruled out since strength is achieved only after film formation and activation.

EMBODIMENTS OF THE INVENTION

An embodiment of the present invention is an aqueous polymer dispersion comprising a concentration of polychloroprene of less than or equal to 40 weight % and a residual monomer content of less than 50 ppm, wherein said aqueous polymer dispersion has a viscosity of less than 50 mPas, a pH stability of greater than 2 hours, and a shear stress largely proportional to the shear rate.

Another embodiment of the present invention is the above aqueous polymer dispersion, wherein the viscosity of said aqueous dispersion changes by a factor of less than or equal to 3 over the range of from 10 to 1,000/s.

Another embodiment of the present invention is the above aqueous polymer dispersion, further comprising a total emulsifier concentration of less than 1.5 weight %.

Another embodiment of the present invention is the above aqueous polymer dispersion, further comprising from 0.1 to 5 parts by weight of ageing/oxidation stabilizers, based on a solids concentration of polychloroprene of 100 parts.

Another embodiment of the present invention is the above aqueous polymer dispersion, wherein said aqueous polymer dispersion has a Zn concentration of less than 0.24 weight %.

Another embodiment of the present invention is the above aqueous polymer dispersion, wherein said aqueous polymer dispersion has a pH of 8 to 10.

Another embodiment of the present invention is the above aqueous polymer dispersion, further comprising 40 to 100 parts by weight of silica/water-glass as a suspension of discrete particles in water, wherein the solids content of the silica suspension is used to calculate the parts and the polychloroprene solids content of a polychloroprene latex is set at 100 parts.

Another embodiment of the present invention is the above aqueous polymer dispersion, wherein said silicas are aqueous silicon dioxide dispersions, the $SiO_2$ particles of which have a primary particle size of from 1 to 400 nm.

Yet another embodiment of the present invention is a process for preparing the above aqueous polymer dispersion, comprising a) continuously or discontinuously (co)polymerizing chloroprene in an aqueous emulsion, optionally with a defined amount of a regulator to form an aqueous polymer dispersion; b) removing residual monomers from said aqueous polymer dispersion down to a value of less than 50 ppm; c) optionally diluting said aqueous polymer dispersion with water; and d) optionally storing said aqueous polymer dispersion under temperature-controlled conditions and/or concentrating and optionally subsequently diluting said aqueous polymer dispersion with water.

Another embodiment of the present invention is the above process, wherein a) is carried out with 0 to 20 parts by weight, based on 100 parts by weight of chloroprene, of copolymerizable ethylenically unsaturated monomers in the presence of 0 to 1 mmol of a regulator, based on 100 g of monomer, at temperatures of 0 to 70° C. in said aqueous emulsion, the resulting aqueous polymer dispersion having a content which is insoluble in organic solvents of 0.1 to 90 weight %, based on the polymer.

Another embodiment of the present invention is the above process, wherein a) is performed as a batch process or as a continuous process.

Another embodiment of the present invention is the above process, wherein constituents are added in succession, simultaneously by means of static mixers/dynamic mixers, or combinations thereof wherein the mixing times are less than 1 hour.

Yet another embodiment of the present invention is an adhesive composition comprising the above aqueous polymer dispersion.

Another embodiment of the present invention is the above adhesive composition, wherein said adhesive composition is applied by brush, roller, spray, or mist.

Yet another embodiment of the present invention is a substrate coated with the above adhesive composition.

Yet another embodiment of the present invention is a process for producing a wet-in-wet bond on foams, comprising (1) applying the above adhesive composition to a substrate by means of spray, brush, or roller application and (2) generating a wet bond before film formation after an air-drying time of less than 5 minutes.

Yet another embodiment of the present invention is a process for producing a wet-in-wet bond on foams, comprising (1) applying the above adhesive composition to less than 75 g/m², based on polychloroprene, on a substrate surface by means of spray, brush, or roller application and (2) generating a wet bond before film formation after an air-drying time of no more than 5 minutes.

Another embodiment of the present invention is the above process, wherein (1) is achieved by conventional medium pressure spray application in the range of from 0.5 to 6 bar or with commercially available "pressureless" battery- or power-operated spray guns widely used in the DIY sector.

Yet another embodiment of the present invention is a process for producing composite materials, comprising bonding joint components with an adhesive composition comprising the above aqueous polymer dispersion.

Yet another embodiment of the present invention is a foam bond in mattress and furniture/upholstery comprising the above aqueous polymer dispersion.

Yet another embodiment of the present invention is a bonded substrate comprising the above aqueous polymer dispersion, wherein said bonded substrate is selected from the group consisting of wood, thermoplastics, elastomers, thermoplastic elastomers, vulcanisates, textile woven fabrics, knitted fabrics, braided fabrics, metals, and stoneware, which have been concreted with one another and/or on to porous substrates having a density of less than 1 kg/liter.

DESCRIPTION OF THE INVENTION

The object of the present invention was therefore to provide ecologically and economically advantageous aqueous adhesive compositions which are stable to ageing, storage and shear and which, after application to the substrates to be bonded, render possible wet-in-wet joining after a short time (waiting time <5 min) with a sufficiently high initial strength (wet strength), in particular in the still moist state and without prior film formation.

It has now been found, surprisingly, that a polymer dispersion which has a particular concentration of polychloroprene and a residual monomer content of <50 ppm overcomes the disadvantages described above. In spite of an extremely low viscosity, the polymer dispersion according to the invention does not tend towards overspray in spray application. The polymer dispersions according to the invention have only an extremely low intrinsic smell, and the resulting adhesive compositions have an outstanding pH, storage and shear stability. The polymer dispersions according to the invention furthermore show, by comparison, a very low tendency towards contamination and blockage of the spray applicators due to their low concentration, viscosity and extreme resistance to shear forces.

The polymer dispersions/adhesive formulations according to the invention are furthermore distinguished by an outstanding pH stability towards HCl and excellent ageing stability, in spite of the absence of potentially environmentally harmful acid-trapping agents, such as ZnO.

It was likewise surprising that on addition of silica suspension to the polymer dispersions according to the invention, the viscosity of the formulation decreases as the silica suspension is added. An essential property which has already been described for these products, in contrast, is the action as a thickener in conventional adhesive formulations (US-A 2003/221778).

The resulting adhesive compositions can be applied to substrates with a comparably low layer thickness, which also involves advantages with respect to the health hazard, combustibility and industrial hygiene, in addition to economic advantages. Because of the low adhesive layer thicknesses and the typically non-covering, sometimes only droplet-like application of the adhesive, there is an outstanding permeability to air and water vapour, such as is urgently desirable in furniture and the upholstery sector for hygiene reasons (prevention of fungus and bacterial attack/growth).

The present invention provides an aqueous polymer dispersion containing a concentration of polychloroprene of ≤40 wt. % and a residual monomer content of <50 ppm, characterized in that this has a viscosity of <50 mPas and a pH stability of >2 h, and the shear stress is largely proportional to the shear rate.

In the context of the present invention, the terms dispersion and latex are used synonymously. In both cases, in combination with polychloroprene, products from free-radical emulsion polymerization of chloroprene are meant concurrently and equivalently, water and polychloroprene being the main constituents and present in separate phases.

Those products which, in addition to polychloroprene, contain other polymeric constituents based on, for example, polyacrylate, polyvinylidene chloride, polybutadiene, polyvinyl acetate or styrene/butadiene dispersions in an amount of up to 50 parts by wt., based on the polychloroprene concentration (and the polychloroprene concentration corresponds to 100 parts by wt.), may also be defined as the polychloroprene latex or adhesive formulation based thereon.

All the percentage data relate to the polymer dispersion or the adhesive formulation, i.e. polymeric components and aqueous components are to be understood as wt. %.

The polymer dispersion according to the invention contains a concentration of polychloroprene of ≤40 wt. %, preferably ≤30 wt. %, particularly preferably ≤25 wt. % and a residual monomer content of <50 ppm, preferably <30 ppm, particularly preferably <20 ppm.

The polymer dispersion according to the invention furthermore has a viscosity of <50 mPas, preferably <40 mPas, particularly preferably <30 mPas, very particularly preferably <20 mPas, measured by means of a Brookfield rheometer at 60 revolutions/s with spindle 2.

The polymer dispersion according to the invention is similar, by specific rheological properties, to a Newtonian liquid, the shear stress being largely proportional to the shear rate and the viscosity changing over the range of 10-1,000/s by a factor of ≤3 preferably by a factor of ≤2.5, particularly preferably by a factor of ≤2.

The polymer dispersion according to the invention furthermore has a pH stability in accordance with DIN 53381, Method B, of >2 h, preferably >3 h and particularly preferably >4 h.

The polymer dispersion according to the invention is furthermore distinguished by a total emulsifier concentration of <1.5 wt. %, preferably <1 wt. %, particularly preferably <0.5 wt. % and very particularly preferably between 0.3 wt. % and 1 wt. %. Possible emulsifiers are in principle all compounds and mixtures thereof which stabilize the emulsion sufficiently, such as e.g. the water-soluble salts, in particular the sodium, potassium and ammonium salts, of long-chain fatty acids, colophony and colophony derivatives, higher molecular weight alcohol sulfates, arylsulfonic acids, formaldehyde condensates of arylsulfonic acids, nonionic emulsifiers based on polyethylene oxide and polypropylene oxide and polymers having an emulsifying action, such as polyvinyl alcohol, preferably the Na and K salts of disproportionated resin acids and all those mentioned in the following documents of the prior art DE-A 2 307 811, DE-A 2 426 012, DE-A 2 514 666, DE-A 2 527 320, DE-A 2 755 074, DE-A 3 246 748, DE-A 1 271 405, DE-A 1 301 502, US-A 2 234 215, JP-A 60-31 510.

The polymer dispersion according to the invention is furthermore distinguished by a Zn concentration of <0.24 wt. %, preferably of =0 wt. %.

The polymer dispersion according to the invention has a pH of 10-8, preferably of 9.8-8.2 and particularly preferably 9.5-8.5, very particularly preferably pH 9.

If required, the pH can be adjusted by the usual inorganic and/or organic acids and/or amino acids and/or buffer systems thereof as Na and K salts, but particularly preferably by glycine.

It is preferable for the polymer dispersion according to the invention likewise to contain conventional anti-ageing agents/oxidation stabilizers/UV stabilizers, preferably based on oligofunctional secondary aromatic amines or oligofunctional substituted phenols, such as products of the type 6-PPD (N-1,3-dimethylbutyl)-N'-phenyl-p-phenylenediamine; Vulkanox®, Lanxess Deutschland GmbH), DTPD, DDA, BPH, BHT, Vulkanox®, S. 423, or compounds based on HALS (hindered amine light stabilizers), benzotriazoles, oxalanilides, hydroxybenzophenones or hydroxyphenyl-S-triazines. Vulkanox® DDA, a diphenylamine derivative, is particularly active. These are typically introduced in emulsified form as an aqueous dispersion. The addition according to the invention of an anti-ageing agent/oxidation stabilizer is 0.1-5 parts by wt., preferably 1-3 parts by wt., particularly preferably 1.5-2.5 parts by wt., based on the polychloroprene concentration=100 parts.

The invention likewise provides a process for the preparation of the polymer dispersion according to the invention, characterized in that a continuous or discontinuous (co)polymerization of chloroprene in aqueous emulsion, without or with the addition of a defined amount of a regulator, first takes place, the residual monomers are subsequently removed down to a value of <50 ppm, dilution with water is optionally subsequently carried out, and finally optionally a temperature-controlled storage and/or concentration and/or pH adjustment and/or post-stabilization with the usual emulsifiers and optionally subsequent dilution with water are carried out.

Polymerization of chloroprene with 0-20 parts by wt., based on 100 parts by wt. of chloroprene, of copolymerizable ethylenically unsaturated monomers in the presence of 0-1 mmol of a regulator, based on 100 g of monomer, preferably 0-0.5 mmol of a regulator at temperatures of 0-70° C., preferably 5-45° C., particularly preferably at 10-25° C., in aqueous, preferably alkaline emulsion, the dispersion having a content which is insoluble in organic solvents of 0.1-90 wt. %, preferably 0.5-60 wt. %, based on the polymer, is preferred.

The emulsion is adjusted to pH values of from 11 to 14, preferably pH 12 to pH 13. The activation is carried out by the conventional activators or activator systems.

Examples of activators and activator systems which may be mentioned are: formamidinesulfinic acid, potassium peroxodisulfate, redox systems based on potassium peroxodisulfate and optionally Silver salt (Na salt of anthraquinone-β-sulfonic acid), compounds such as formamidinesulfinic acid, the Na salt of hydroxymethanesulfinic acid, sodium sulfite and sodium dithionite, for example, serving as redox partners. Redox systems based on peroxides and hydroperoxides are also suitable. The preparation of the polychloroprenes according to the invention can be carried out both continuously and discontinuously, the continuous polymerization being preferred in the preparation of emulsion polymers having a low solids content because of the better profitability.

Copolymerizable monomers, for example described in "Methoden der organischen Chemie" (Houben-Weyl) XIV/1, 738 et seq., Georg Thieme Verlag Stuttgart 1961, are contained in a content of up to 20 parts by wt., based on the chloroprene concentration=100 parts. Compounds having 3 to 12 C atoms and 1 or 2 copolymerizable C=C double bonds per molecule are preferred. Examples of preferred copolymerizable monomers are 2,3-dichlorobutadiene and 1-chlorobutadiene, acrylonitrile, acrylic acid, maleic acid, fumaric acid or ethylene glycol dimethacrylate.

Chain transfer agents, such as mercaptans or such as xanthogen disulfides, can be used to adjust the molecular weight. Preferred chain transfer agents are n-dodecylmercaptan and xanthogen disulfides or dithiocarbamates.

The polymerization is conventionally interrupted at 50-95%, preferably at 60-80% particularly preferably at 65-75% of the monomer conversion, it being possible to add as an inhibitor e.g. phenothiazine, tert-butylpyrocatechol or diethylhydroxylamine.

The polymer dispersion according to the invention preferably has an average particle diameter of from 50 to 250 nm, preferably from 60 to 200 nm, particularly preferably 70 to 150 nm.

After the polymerization, the residual chloroprene monomer is preferably removed down to residual concentrations of <50 ppm, for example by a steam distillation and/or column devolatilization.

Storage is carried out at temperatures of 50° C.-110° C., preferably 60-100° C., particularly preferably 70-90° C., the content which is insoluble in organic solvents (gel content) increasing by at least 10 wt. % to 1-60 wt. %, preferably to 5-30 wt. %, particularly preferably to 10-20 wt. %.

Alternatively, a gel content can be achieved by reducing the regulator concentration and/or increasing the monomer conversion. The gel types mentioned differ significantly from one another in the polymer properties.

In a further step of the preparation process according to the invention, the solids content of the dispersions can be increased by a creaming process. This creaming is carried out e.g. by addition of alginates, as described in "Neoprene Latices, John C. Carl, E.I. Du Pont 1964, p. 13". In this context, excess emulsifier and salts are separated off together with the serum. An increase in the solids content of from <50 wt. % after the polymerization to 50-65 wt. %, preferably to 52-59 wt. % by a creaming process is possible in this context, as a result of which a dispersion having a very low salt content is formed, in particular a low content of chloride ions, which is particularly preferably less than 500 ppm.

The usual stabilizers can optionally be added to the dispersions obtained to improve the stability to ageing, oxidation and/or UV.

If necessary, the dispersion obtained can moreover be adjusted to the polychloroprene concentrations according to the invention of ≤40 wt. %, preferably ≤30 wt. %, particularly preferably ≤25 wt. % by means of water and/or silica suspensions.

The polymer dispersion according to the invention preferably contains 40-100 parts by wt., preferably 50-90 parts by wt., particularly preferably 60-80 parts by wt of silica/waterglass as a suspension of discrete particles in water, the solids content of the silica suspension being used to calculate the parts and the polychloroprene solids content of a polychloroprene latex being set=100 parts.

The silicas are those based on silica sol, silica gel, pyrogenic silicas or precipitation silicas or mixtures of the said silicas.

Silica sols are colloidal solutions of amorphous silicon dioxide in water, which are also called silicon dioxide sols, but usually silica sols for short. The silicon dioxide is present here in the form of spherical particles which are hydroxylated on the surface. The particle diameter of the colloid particles is as a rule 1 to 200 nm, the specific BET surface area (determined by the method of G. N. Sears, Analytical Chemistry vol. 28, no. 12, 1981-1983, December 1956), which correlates with the particle size, being 15 to 2,000 m$^2$/g. The surface of the SiO$_2$ particles has a charge which is compensated by a corresponding counter-ion and leads to stabilization of the colloidal solution. The silica sols stabilized with alkali have a pH of from 7 to 11.5 and contain as the alkalizing agent, for example, small amount of Na$_2$O, K$_2$O, Li$_2$O, ammonia, organic nitrogen bases, tetraalkylammonium hydroxides or alkali metal or ammonium aluminates. Silica sols can also be present in weakly acidic form as semistable colloidal solutions. It is furthermore possible to prepare cationically adjusted silica sols by coating the surface with Al$_2$(OH)$_3$Cl. The solids concentrations of the silica sols are 5 to 60 wt. % of SiO$_2$.

If an SiO$_2$ raw material present as an isolated solid, such as, for example, pyrogenic or precipitated silica, is employed for the polymer dispersion according to the invention, this is converted into an aqueous SiO$_2$ dispersion by dispersing.

Preferably, those aqueous silicon dioxide dispersions in which the SiO$_2$ particles have a primary particle size of from 1 to 400 nm, preferably 5 to 100 nm and particularly preferably 8 to 50 nm are employed. In the case where precipitated silicas are employed, these are ground for the purpose of reducing the particle size.

Preferred polymer dispersions according to the invention are those in which the SiO$_2$ particles of the silicon dioxide dispersion are present as discrete non-crosslinked primary particles. It is likewise preferable for the SiO$_2$ particles to have hydroxyl groups on the particle surface.

Aqueous silica sols are particularly preferably employed as aqueous silicon dioxide dispersions.

In a further step of the process according to the invention, the dispersion can be adjusted to a pH of 8-10 with the usual inorganic and/or organic acids and/or amino acids and/or buffer systems thereof as Na and K salts.

All the top-ups and formulation constituents to obtain the dispersions according to the invention can be effected successively in a batch process or advantageously also in a continuous process, e.g. by mixing by means of static or dynamic mixers.

The invention furthermore provides a process for the preparation of the products according to the invention by means of a static and/or dynamic mixer, the mixing times being <1 h, preferably <30 min, particularly preferably <5 min.

The present application likewise provides adhesive compositions comprising the polymer dispersions according to the invention.

The adhesive compositions optionally comprise, in addition to those according to the invention, the conventional adhesive auxiliaries and additives, such as, for example, metal oxides, such as MgO and/or ZnO, as additional acid-trapping agents. Further adhesive auxiliaries and additives are, for example, fillers, such as quartz flour, quartz sand, highly disperse silica, barite, calcium carbonate, chalk, dolomite or talc, optionally together with wetting agents, for example polyphosphates (such as sodium hexametaphosphate), naphthalenesulfonic acid, ammonium or sodium polyacrylic acid salts, and alkali metal and alkaline earth metal salts of phosphoric acid, the fillers in general being added in amounts of from 0 to 60 parts by wt., based on the polychloroprene concentration=100 parts, and the wetting agents in general being added in amounts of from 0 to 1 part by wt., based on the filler.

The adhesive compositions comprising the polymer dispersion according to the invention can optionally also comprise other dispersions, such as e.g. polyacrylate, polyvinylidene chloride, polybutadiene, polyvinyl acetate or styrene/butadiene dispersions, in a content of up to 50 parts by wt., based on the polychloroprene (co)polymer concentration=100 parts.

Further possible auxiliaries are, for example, organic thickening agents, such as cellulose derivatives, alginates, starch, starch derivatives or polyacrylic acid, which are to be employed in amounts of from 0 to 3 parts by wt., based on the polychloroprene concentration=100 parts, or inorganic thickening agents, such as, for example, bentonites, which are to be employed in amounts of from 0 to 10 parts by wt., based on the polychloroprene concentration=100 parts.

Fungicides and bactericides can also be added to the adhesive composition according to the invention for preservation. These can be employed in general in amounts of from 0 to 1 wt. %, based on the adhesive. Suitable fungicides are, for example, phenol derivatives and cresol derivatives or organotin compounds.

Tackifying resins, such as e.g. non-modified or modified natural resins, such as colophony esters, hydrocarbon resins or synthetic resins, such as phthalate resins, can optionally also be added to the adhesive composition in dispersed form. Alkylphenol resin dispersions having softening points above 110° C. are preferred.

Organic solvents, such as, for example, toluene, xylene, butyl acetate, methyl ethyl ketone, ethyl acetate, dioxane or mixtures thereof, or plasticizers, such as, for example, those based on adipate, phthalate or phosphate, can optionally be added to the polychloroprene dispersions.

The polymer dispersions/adhesives according to the invention can be applied to the substrates by means of all the usual forms of application, such as brushing, rolling, spraying and misting, and the adhesives according to the invention are preferably applied by means of spray application.

The present invention likewise provides a process for the production of a wet-in-wet bond on foams, characterized in that an adhesive composition comprising the polymer dispersions according to the invention is applied to a substrate, for example by means of spray application, roller application or brush application, and after an air-drying time of <5 min, preferably <2 min, particularly preferably ≤1 min, a wet bond is generated before film formation.

A particular feature of the dispersions according to the invention is their stability to ageing at elevated temperature, no deposits of >5%, preferably >3%, particularly preferably >1% being observed after storage for 1 hour, preferably 3 h, particularly preferably 8 h at 90° C. and 3 d, preferably 5 d, particularly preferably 7 d at 70° C. In this context, a change in viscosity of <30 mPa*s, preferably <25 mPa*s, particularly preferably <20 mPa*s is observed. The aged product can be employed for bonding of e.g. foams by means of spray application, brush and roller application by prolonging the contact time to more than 5 min without loss of function.

A further particular feature of the dispersions according to the invention is their stability at low temperatures, no deposits of >5%, preferably >3%, particularly preferably >1% being observed after cooling to <5° C., preferably 3.5° C., particularly preferably 2° C. In this context, a change in viscosity of <30 mPa*s, preferably <25 mPa*as, particularly preferably <20 mPa*s is observed. The shear stability is retained without formation of coagulate at a shear rate of 1,000/s, preferably 5,000/s, particularly preferably 10,000/s not??? for >1 min, preferably 3 min, particularly preferably 5 min. The cooled product can be employed for bonding of e.g. foams by means of spray application, brush and roller application by prolonging the contact time to more than 5 min without loss of function.

A further particular feature of the dispersions according to the invention is their long-term storage stability and long-term stability to attack by bacteria and fungi even without addition of bacteriostatics or fungicides, no deposits of >5%, preferably >3%, particularly preferably >1% being observed after 3 months, preferably 4 months, particularly preferably 5 months at RT (defined as 21° C.). In this context, a change in viscosity of <30 mPa*s, preferably <25 mPa*s, particularly preferably <20 mPa*s is observed. The product according to the invention can be employed for bonding of e.g. foams by means of spray application, brush and roller application by prolonging the contact time to more than 5 min without loss of function.

A particular feature of the process according to the invention is that the application of adhesive can be effected with, based on polychloroprene, <75 g/m$^2$ of substrate surface, preferably <50 g/m$^2$ of substrate surface, particularly preferably <40 g/m$^2$ of substrate surface.

In the process according to the invention, the spray application is carried out by means of conventional medium pressure spray application in the range of 0.5-6 bar, but spray application with commercially available "pressureless" battery- or power-operated spray guns widely used in the DIY sector is also possible.

The present invention also provides substrates coated with adhesive compositions comprising the polymer dispersions according to the invention.

The polymer dispersion according to the invention can be used for bonding any desired substrates of the same or different nature, e.g. wood, paper, plastics, textiles, leather, rubber and inorganic materials, such as ceramic, stoneware or asbestos cement, and bonding of foams is preferred.

The invention likewise provides the use of the polymer dispersion according to the invention as an adhesive formulation in brush, roller, spray and mist application. The present invention likewise provides a use of the polymer dispersions according to the invention for the production of foam bonds in mattress and furniture/upholstery bonding.

The invention moreover provides a process for the production of composite materials, characterized in that the polymer dispersions according to the invention are employed in the bonding of the joint components.

EXAMPLES

A) Starting Substances

TABLE 1

| Polymer dispersions | | |
|---|---|---|
| Dispersion | Polychloroprene type | Product |
| | pH 12, highly crystallizing, gel-free, solids content 55 +/− 0.5% | Dispercoll ® C 84, BMS AG, DE |
| | pH 12, moderately crystallizing, moderate gel content, solids content 58 +/− 0.5% | Dispercoll ® 74, BMS AG, DE |
| | pH 12, slowly crystallizing, solids content 58 +/− 0.5% | Dispercoll ® C VPLS 2372 H, BMS AG, DE |
| | pH 12, rapidly crystallizing, solids content 55% +/− 0.5% | Dispercoll ® C VPLS 2325, BMS AG, DE |
| | pH 12, rapidly crystallizing, gel-free, solids content 32 +/− 1% | Dispercoll ® C84 thin latex, BMS AG, DE |
| | ph 12, normally crystallizing, gel-free, solids content 32 +/− 1% | Baypren ® 210 thin latex, Lanxess AG, DE |
| | pH 12, slowly crystallizing, gel-free, solids content 32 +/− 1% | Baypren ® 110 thin latex, Lanxess AG, DE |
| | pH 12, rapidly crystallizing, gel-free, solids content 32 +/− 1% | Baypren ® 320 thin latex, Lanxess AG, DE |
| | pH 12, rapidly crystallizing, solids content 32 +/− 1% | Thin latex Dispercoll ® C VPLS 2325, BMS AG, DE |
| | pH 12, rapidly crystallizing, solids content 32 +/− 1% | Thin latex Dispercoll ® C VPLS 2372H, BMS AG, DE |

TABLE 1-continued

Polymer dispersions

| Dispersion | Polychloroprene type | Product |
|---|---|---|
| | pH 12, rapidly crystallizing, gel-free, solids content 32 +/− 1% | Dispercoll ® C 84, diluted with completely demineralized water, BMS AG, DE |
| | pH 12, rapidly crystallizing, solids content 32 +/− 1% | Dispercoll ® C VPLS 2325, diluted with completely demineralized water, BMS AG, DE |
| | pH 12, rapidly crystallizing, solids content 32 +/− 1% | Dispercoll ® C VPLS 2372H, diluted with completely demineralized water, BMS AG, DE |

TABLE 2

Silica suspensions

| Product | Supplier | Delivery form | Type |
|---|---|---|---|
| Dispercoll ® S3030 | BMS AG, DE | Dispersion, 30% strength | Silica sol |
| Dispercoll ® S5005 | BMS AG, DE | Dispersion, 50% strength | Silica sol |

TABLE 3

Additives and auxiliary substances

| Product | Solids content | Function | Manufacturer |
|---|---|---|---|
| Rhenofit ® DDA-EM 50 | 50% | Anti-ageing agent | Lanxess AG |
| Borcherts ® VP 9802 ZnO | 50% | Stabilizer | Borchers GmbH, Langenfeld, DE |
| Evonik ® VP AD Nano ZnO 20 DW | 35% | Stabilizer | Evonik AG |
| Plextol ® 4545 | 50% | Acrylate latex | Polymer latex |

TABLE 4

Finished adhesive dispersions

| Product | Solids content | Function | Manufacturer |
|---|---|---|---|
| C1 = Simalfa 309 | 54% | Spray adhesive | Simalfa AG |
| C2 = Upaco 7300E | 50% | Spray adhesive | Worthen Industries Inc. |
| C3 = Saba 3700 | 50% | Spray adhesive | Saba Dinxperlo BV |
| C4 = BMS guideline recipe | 53% | Spray adhesive | BMS AG, 1C guideline spray recipe |

B) Measurement Methods

1. Determination of the Gel Content from the Dispersion

The dispersion is applied to a glass plate and dried to a film for 3 days at room temperature under a nitrogen atmosphere. 250 mg of sample are dissolved or swollen in 25 ml of THF (to which is added 1 g of polymerization inhibitor per litre of THF) for 24 hours at room temperature in a closed vessel. The mixture is ultracentrifuged for 1 hour at 20,000 rpm and the weight content of the material centrifuged off is determined, after drying.

2. Determination of the Viscosity

The viscosity of the dispersions is measured by means of a Brookfield viscometer by a Bayer method.

Spindle no. 2 is cautiously immersed in the dispersion to be measured, as far as possible without the formation of air bubbles. Place the sample bottle on a lifting platform and initially raise until the spindle can be fixed to the drive axle (screw on—left-hand thread) without the spindle body emerging from the dispersion.

Raise the lifting platform further, immerse the spindle in the sample up to the immersion groove on the spindle shaft. Switch on the motor.

As soon as the LED display of the measurement value has stabilized, the measurement value is read off. The measurement is carried out at 60 rpm by means of spindle 2 as standard. At higher viscosities, the speed of rotation is reduced to 30 rpm to stabilize the measurement value.

3. Determination of the HCl Stability

The dried adhesive samples are tested in accordance with DIN 53381, Method B.

Measurement Procedure:

Measuring apparatus: 763 PVC—Thermomat from Metrohm, CH-9101 Herisau, Switzerland The samples (thickness 0.1-1 mm) are cut to an edge length of approx. 2-3 mm, 0.2 g is weighed into a test tube and the measurement is carried out at 180° C. with air as the carrier gas. The electrical resistance of water, in which the HCl gas formed dissolves again, is measured. The point in time at which the electrical resistance has reached the value of 50 μS/cm is stated as the HCl stability. The higher the value, the more stable the sample measured to splitting off of HCl.

4. Determination of the Emulsifier Concentration (Resin Acid Derivatives)

The emulsifier concentration with respect to the resin acid salts as the main emulsifier of polychloroprene dispersions is determined by titration from THF solution by means of the titration system "Tinet 2" from Metrohm. The titration is carried out with a Solvotrode (no. 6.0229.100), which is stored in water and during the day is kept on measurement standby in a mixture of THF/water (80:20) before and between the measurements. The titrating agent is a 0.1 molar perchloric acid solution. Evaluation of the results and entering of the values and titration curves into a table compiled by the system is automatic. If the composition is known, the emulsifier content can also be calculated. Further additional emulsifiers are determine by quantitative IR analysis after being separated off.

5. Measurement/Calculation of the Polychloroprene Concentration from the Solids Content The polychloroprene concentration from adhesive formulations is determined gravimetrically by redissolving the polymeric content by means of toluene/acetic acid or THF and subsequent precipitation of the polymer content in methanol, after drying. If various polymer contents are present, the contents are quantified by means of a linked quantitative IR analysis. If the composition is known, the polychloroprene content can also be calculated.

6. Determination of the Residual Monomer Content

The residual monomer content is determined by means of gas chromatography by a Bayer works method from the latex after the polymer has been redissolved in an organic phase.

7. Determination of the Reactivity with Respect to Wet-In-Wet Bonding by Means of Spray Application to Polyurethane Foam Specimens The adhesive formulation is applied to the test material by means of a Walther PILOT type: XIII-ND spray gun under an air pressure of approx. 3 bar.

PU foam specimens as follows are used: foam quality: stn/schaumstoff-technik-Nürnberg GmbH Type: ST 5540, test specimen dimensions: 101×49×30 mm
Material base: PU, colour: white, gross weight (kg per $m^2$): 40
Net bulk density (kg per $m^2$) ISO-845: 38, compressive strength 40% (kPa) DIN EN ISO 3386: 5.5
Tensile strength (kPa) DIN EN ISO 1798: >120, elongation at break (%) ISO-1798: >110
Compression set (50%/70° C./22 h) DIN EN ISO-1856: <4

To evaluate the wet-in-wet bondability and initial strength, the test specimens are kinked in the middle with a wooden bar immediately and at various times after application of approx. 40-300 g/m² of adhesive in the wet state and passed through 2 steel rolls at a distance of 10 mm within <3 sec. The minimum waiting time until the bond has a sufficient immediate strength so that the restoring forces of the foam no longer open the bond after passage through the gap is recorded, as well as the longest time over which successful bonding is still possible (open time).

In an alternative procedure, the adhesive formulation is applied by means of a Wagner W 550 fine spray system by means of a nozzle for tiny amounts or analogous bellows-operated "pressureless (0.5 bar)" spray application systems. The amount applied and testing of the bondability and initial strength are analogous to those above.

8. Determination of the Heat Resistance on Foam Bonds

The foam bonds as described above are temperature-controlled for at least 2 h in a hot air oven preheated to 50° C., 70° C., 90° C., 110° C., 130° C. and the temperature at which the bond fails (opening of the bonded foams under tension, see method 7) is determined.

9. Determination of the Viscosity Stability of the Formulations

Testing is carried out by repeated viscosity measurement on the adhesive formulations by means of a Brookfield viscometer after preferably 1, 3 and 7 days.

10. Determination of the Peel Strength on NORA Test Specimens

Testing is carried out in accordance with EN 1392.

A 100 μm thick wet film of the dispersion is applied to two test specimens (nora rubber, roughened, 100×30 mm) and air-dried at room temperature for 1 hour. The test specimens are then joined together for 10 seconds under 4 bar. Testing of the tear properties is carried out on a commercially available tensile tester at room temperature. The strength values are determined immediately after the bonding and after 1 and 9 days.

11. Determination of the Heat Distortion Point

The NORA test specimens are bonded with an overlap of 2 cm², loaded with 4 kg and temperature-controlled at 40° C. in a heating cabinet in the course of 30 min. The test specimens are then heated up to 150° C. at a linear heating rate of 0.5° C./min. The softening temperature, i.e. the temperature in ° C. at which the bond fails in the shear test under the 4 kg load, is recorded. In each case 5 individual measurements are carried out.

12. Determination of the Resistance to Shear

The shear stability of dispersions is determined in a rotary rheometer with a Couette or Searle measuring device. In this context, the specimens pass through a logarithmic shear gradient (from 0 to 15,000 1/s in 240 s) at a fixed temperature (25° C.) and a very small shear gap (gap width 240 μm, external diameter 13.308 mm and internal diameter 13.0655 mm). Shear-induced coagulation leads to a sudden apparent increase in the viscosity because the coagulates block the shear gap. This shear rate whereby the increase in the viscosity is determined, is taken as a measure of the shear stability. If no formation coagulate is found in a sample during the shear gradient, the shear forces are continued at the maximum shear rate of 15,000 $s^{-1}$ over a period of 600 s with a measurement cycle of 1 s (1 viscosity determination/s). Should the viscosity increase suddenly during this time gradient, this time is rated as a measure of the stability.

13. Determination of the Rheological Properties

The rheological properties are determined in accordance with DIN 53019 Determination of viscosity and flow curves with rotational viscometers (or ISO 3219).

14. Determination of the pH

A single-stick measuring electrode (e.g. Sentron pH meter) is immersed in the dispersion or solution to be tested. This apparatus comprises a measuring and a reference electrode. The potential difference existing between the measuring and reference electrode is read off as the pH on the measuring apparatus.

The particular operating instructions from the manufacturer should be noted when handling the single-stick measuring electrode.

C) Preparation Processes for the Adhesive Formulations According to the Invention Process: Polymerisation of Chloroprene The polymerization is carried out by a continuous process such as is described in EP-A 0 032 977.

Example A 1

The aqueous phase (W) and the monomer phase (M), via a measurement and control apparatus in an always constant ratio, and the activator phase (A) are introduced into the first reactor of a polymerization cascade comprising 7 identical reactors each having a volume of 50 litres. The average dwell time per tank is 25 minutes. The reactors correspond to those in DE-A 2 650 714 (data in parts by wt. per 100 g parts by wt. of monomer employed).

(M)=Monomer Phase;

| | |
|---|---|
| Chloroprene | 100.0 parts by wt. |
| n-Dodecylmercaptan | 0.11 part by wt. |
| Phenothiazine | 0.005 part by weight |

(W)=Aqueous Phase:

| | |
|---|---|
| Demineralized water | 115.0 parts by wt. |
| Sodium salt of a disproportionated abietic acid | 2.6 parts by wt. |
| Potassium hydroxide | 1.0 part by wt. |

(A)=Deactivator Phase:

| | |
|---|---|
| 1% strength aqueous formamidinesulfinic acid solution | 0.05 part by wt. |
| Potassium persulfate | 0.05 part by wt. |
| Anthraquinone-2-sulfonic acid Na salt | 0.005 part by wt. |

The reaction starts readily at an internal temperature of 15° C. The heat of polymerization liberated is removed and the polymerization temperature kept at 10° C. by external cooling. The reaction is interrupted at a monomer conversion of 70% by addition of diethylhydroxylamine.

The residual monomer is removed from the polymer down to a residual monomer content of <50 ppm by steam distillation with subsequent column devolatilization. The solids content is approx. 32 wt. %, the gel content is 0.1 wt. % and the pH is 13.

After a polymerization time of 120 hours, the polymerization line is run at full capacity.

Example B 1

The procedure is as in Example A 1, but the regulator content is reduced to 0.03 wt. %, the monomer conversion is increased to 80% and the polymerization temperature is increased to 45° C. in order to produce a polymer having a high gel content.

The solids content is 38 wt. % and the gel content is 60 wt. %, and the pH is 12.9.

Further Processing of the Dispersions
Working Up 1: Dilution, Stabilization, pH Adjustment The dispersions obtained from Example A 1 and B 1 are reduced to a polychloroprene content of approx. 30% with deionized water, 2 parts of Rhenofit DDA 50 EM, based on the polychloroprene concentration=100 parts, are added and the pH is adjusted to 9.5 with glycine powder. The product A 2 and product B 2 according to the invention are obtained.

Working Up 2: Hydrolysis of the Allylic CI and Increase in the Gel Content

Dispersion A 1 is temperature-controlled at temperatures of between 60 and 90° C. in an insulated storage tank for 6 hours to 6 days, the temperature being adjusted, if appropriate, by additional heating, and the increase in the gel content in the latex is measured with the aid of samples.

Thereafter, the samples are fed to Working up 1. Dilution, stabilization, pH adjustment. The product A 3 according to the invention is obtained.

Working Up 3: Creaming Process

Solid alginate (Manntex) is dissolved in deionized water and a 2 wt. % strength alginate solution is prepared. 200 g each of the polychloroprene dispersion A 1, B 1, A 3 are initially introduced into eight 250 ml glass bottles and are stirred in with in each case 6 to 20 g of the alginate solution—in 2 g steps. After a storage time of 24 hours, the amount of serum formed above the thick latex is measured. The amount of alginate in the sample with the highest formation of serum is multiplied by 5 and gives the optimum amount of alginate for creaming of 1 kg of polychloroprene dispersion. The dispersions are creamed to a solids concentration of >50%, based on the polychloroprene concentration, and the serum obtained is discarded.

Thereafter, the samples are fed to Working up 1. Dilution, stabilization and pH adjustment. The product A 4 and B 3 according to the invention are obtained.

Working Up 4: Dilution with Aqueous Silica Sols (Dispercoll® S), Stabilization, pH Adjustment Taking Working up 3 as the basis, instead of a direct adjustment of the pH and stabilization, dilution is carried out with Dispercoll S3030 to a polychloroprene concentration of <35%, and stabilization and adjustment to pH 9.5 are carried out as described above.

The product A 5 and B 4 according to the invention is obtained.

Example C

General Process for the Preparation of Adhesive Formulations According to the Invention Starting from Dispercoll® C Commercial Products Having a Monomer Concentration of <50 ppm For the preparation of a formulation according to the invention, Dispercoll® C 84/74/VPLS 2325/VPLS 2372H as an individual component or in a blend as commercially obtainable is initially introduced into a glass beaker. The antioxidant Rhenofit® DDA-50 EM as a 50% dispersion and, as required, zinc oxide in the form of the dispersion Borchers 9802 and further constituents, such as resins, fillers, thickeners, typically present as a dispersion, are then added in succession, while stirring. Finally, as required, the silica sol (Dispercoll® S) is added, while stirring. As an alternative to the silica sol, the concentration of the polychloroprene in the formulation is lowered to the desired value by means of deionized water.

After all the desired constituents have been mixed in, the pH is adjusted to the target pH of the formulation by means of glycine powder.

Example D

General Process for the Preparation of Comparison Adhesive Formulations (not According to the Invention) Again Starting from Dispercoll® C Commercial Products The preparation of adhesive formulations (comparison examples, not according to the invention) identified by * according to Table 5-11 is carried out by stirring the components together in a glass beaker, starting with the polymer dispersion. Further constituents, as required, such as stabilizers, ZnO, resins, fillers, thickeners, silica suspensions, additional emulsifiers, typically present as a dispersion, are then added in succession, while stirring.

The data for the parts of formulation constituents employed always relate to the solids content or to the non-aqueous content of the formulation constituent, based on the solids content of the polychloroprene latex, which is set equal to 100 parts.

This rule is always valid except in the case of addition of water as an explicit formulation constituent, the water then being based in turn in terms of the amount on the solids content of the polychloroprene latex, which is set equal to 100 parts.

TABLE 5

Influence of the pH on the adhesive properties

|  | 1* | 2* | 4 | 5 | 6 | 7 | 8 |
|---|---|---|---|---|---|---|---|
| Formulation composition [parts] |  |  |  |  |  |  |  |
| Dispercoll ® C 84 thin latex [32%] | 100 | 100 | 100 | 100 | 100 | 100 | 100 |
| Rhenofit ® DDA-50 EM [50%] | 2.0 | 2.0 | 2.0 | 2.0 | 2.0 | 2.0 | 2.0 |
| Glycine powder [100%] | 0 | 1 | 2 | 3 | 4 | 6 | 31 |
| Results: |  |  |  |  |  |  |  |
| pH | 12.6 | 11.9 | 9.8 | 9.7 | 9.6 | 9.5 | 8.6 |
| Monomer content [ppm] | 11 | 10 | 10 | 10 | 10 | 10 | 8 |
| Solids content [%] | 32 | 32 | 33 | 33 | 33 | 34 | 38 |

TABLE 5-continued

Influence of the pH on the adhesive properties

|  | 1* | 2* | 4 | 5 | 6 | 7 | 8 |
|---|---|---|---|---|---|---|---|
| Polychloroprene solids content [%] | 31 | 30 | 30 | 30 | 30 | 30 | 28 |
| Viscosity [mPa * s] | 12 | 10 | 23 | 19 | 18 | 20 | 40.6 |
| HCl stability at 50 µS [min] | 48 | 156 | 126 | 221 | 268 | 279 | 340 |
| Contacting after 1-C spray [min] | >10 | >10 | 2 | (1) | 2 | 1 | 2 |
| Open time [min] | — | — | >10 | >10 | >10 | >10 | >10 |

Examples which are not according to the invention are identified with *. A number in parentheses in the Contacting after 1-C spray [min] row means that the bonding was successful, but a slight detachment at the edge is visible.

It can be clearly seen that when pH values which are not according to the invention are employed, a wet-in-wet bonding of <5 min is not successful. It can furthermore be seen that in some cases no adequate HCl and therefore storage stability is achieved.

TABLE 6

Influence of the dilution on the adhesive properties

|  | 9* | 10 | 11 | 12 | 13 |
|---|---|---|---|---|---|
| Formulation composition [parts] |  |  |  |  |  |
| Dispercoll ® C 84 diluted [32%] |  |  |  |  | 100 |
| Dispercoll ® C 2372H diluted [32%] |  | 100 | 50 | 50 |  |
| Dispercoll ® C 2372H [55%] | 100 |  |  |  |  |
| Dispercoll ® C 2325 diluted [32%] |  |  | 50 | 50 |  |
| Rhenofit ® DDA-50 EM [50%] | 2.0 | 2.0 | 2.0 | 2.0 | 2.0 |
| Dispercoll ® S 3030 [30%] |  |  |  | 80 |  |
| Glycine powder [100%] | 2 | 1.5 | 2 | 2 | 1.5 |
| Results: |  |  |  |  |  |
| pH | 9.5 | 9.5 | 9.5 | 9.5 | 9.5 |
| Monomer content [ppm] | 31 | 12 | 13 | 4 | 10 |
| Solids content [%] | 56 | 33 | 33 | 31 | 33 |
| Polychloroprene solids content [%] | 52 | 30 | 30 | 17 | 30 |
| Viscosity [mPa * s] | 105 | 14 | 13 | 17 | 20 |
| HCl stability at 50 µS [min] | >291 | >311 | >281 | >580 | 281 |

TABLE 6-continued

Influence of the dilution on the adhesive properties

|  | 9* | 10 | 11 | 12 | 13 |
|---|---|---|---|---|---|
| Contacting after 1-C spray [min] | 3 | 2 | 2 | 3 | 1 |
| Open time [min] | >10 | >10 | >10 | >10 | >10 |

It can be clearly seen that omitting creaming and/or dilution of commercially available lattices does not impair and in some cases improves the adhesive properties in combination with the properties according to the invention, such as pH and viscosity.

TABLE 7

Influence of the dilution with Dispercoll ® S 3030 (30%) silica suspensions on the adhesive properties and heat distortion point

|  | 14* | 15 | 16 | 17 | 18 | 19 |
|---|---|---|---|---|---|---|
| Formulation composition [parts] |  |  |  |  |  |  |
| Dispercoll ® C 84 diluted to [32%] |  | 100 |  | 100 |  |  |
| Dispercoll ® C 84 [55%] | 100 |  | 100 |  |  |  |
| Dispercoll ® C 2325 diluted [32%] |  |  |  |  |  | 100 |
| Dispercoll ® C VP LS 2325 [55%] |  |  |  |  | 100 |  |
| Rhenofit ® DDA-50 EM [50%] | 2.0 | 2.0 | 2.0 | 2.0 | 2.0 | 2.0 |
| Dispercoll ® S 3030 [30%] |  |  | 80 | 80 | 80 | 80 |
| Glycine powder [100%] | 1.5 | 1 | 1.5 | 1 | 2 | 1.5 |
| Results: |  |  |  |  |  |  |
| pH | 9.5 | 9.5 | 9.5 | 9.5 | 9.5 | 9.5 |
| Residual monomer content [ppm] | 34 | 15 | 14 | 5 | 18 | 6 |
| Polychloroprene solids content [%] | 52 | 31 | 22 | 17 | 22 | 17 |
| Solids content [%] | 56 | 34 | 41 | 32 | 41 | 32 |
| Viscosity [mPa * s] | 73.1 | 20 | 24 | <5 | 20 | <5 |
| HCl stability at 50 µS [min] | 324 | 281 | 380 | 377 | 515 | 573 |
| Contacting after 1-C spray [min] | 1 | 1 | (1) | 2 | 2 | 2 |
| Open time [min] | >10 | >10 | >10 | >10 | >10 | >10 |

It can be clearly seen that the formulations according to the invention have comparable bondabilities in combination with a significantly lower solids and polychloroprene content. Advantages are also evident in the HCl stability and in the residual monomer content.

TABLE 8

Influence of the dilution with Dispercoll ® S 3030 silica suspensions on the adhesive properties and heat distortion point

|  | 20* | 21 | 22 | 23 | 24 | 25 | 26 |
|---|---|---|---|---|---|---|---|
| Formulation composition [parts] |  |  |  |  |  |  |  |
| Dispercoll ® C VP LS 2325 [55%] | 100 | 100 | 100 | 100 | 100 | 100 | 100 |
| Rhenofit ® DDA-50 EM [50%] | 2.0 | 2.0 | 2.0 | 2.0 | 2.0 | 2.0 | 2.0 |
| Dispercoll ® S 3030 [30%] |  | 50 | 60 | 70 | 80 | 90 | 100 |
| Glycine powder [100%] | 6 | 10 | 10 | 10 | 10 | 10 | 10 |

TABLE 8-continued

Influence of the dilution with Dispercoll ® S 3030 silica suspensions on the adhesive properties and heat distortion point

|  | 20* | 21 | 22 | 23 | 24 | 25 | 26 |
|---|---|---|---|---|---|---|---|
| Results: | | | | | | | |
| pH | 9.0 | 9.0 | 9.0 | 9.0 | 9.0 | 9.0 | 9.0 |
| Residual monomer content [ppm] | 34 | 18 | 15 | 14 | 11 | 10 | 9 |
| Polychloroprene solids content [%] | 49 | 27 | 24 | 23 | 21 | 20 | 18 |
| Solids content [%] | 57 | 45 | 44 | 42 | 42 | 41 | 40 |
| Viscosity [mPa * s] | 76 | 14 | 7 | 7 | 8 | 6 | <5 |
| HCl stability at 50 µS [min] | 818 | 642 | 598 | 562 | 576 | 607 | 704 |
| Contacting after 1-C spray [min] | immediate | 1 | 1 | 1 | 1 | 2 | 3 |
| Open time [min] | >10 | >10 | >10 | >10 | >10 | >10 | >10 |

Table 8 shows the high capacity for filling or dilutability of the formulations according to the invention with silica suspensions. The adhesive properties only start to deteriorate noticeably at >100 parts of silica suspension. At the same time, the polymer content can be lowered down to <20% in this way, which is an enormous economic and ecological advantage.

TABLE 9

Influence of the dilution with Dispercoll ® S 5005 silica suspensions on the adhesive properties and heat distortion point

|  | 27 | 28 | 29 | 30 | 31 | 32 |
|---|---|---|---|---|---|---|
| Formulation composition [parts] | | | | | | |
| Dispercoll ® C VP LS 2325 [55%] | 100 | 100 | 100 | 100 | 100 | 100 |
| Rhenofit ® DDA-50 EM [50%] | 2.0 | 2.0 | 2.0 | 2.0 | 2.0 | 2.0 |
| Dispercoll ® S 5005 [50%] | 50 | 60 | 70 | 80 | 90 | 100 |
| Glycine powder [100%] | 10 | 10 | 10 | 10 | 10 | 10 |
| Results: | | | | | | |
| pH | 9.0 | 9.0 | 9.0 | 9.0 | 9.0 | 9.0 |
| Residual monomer content [ppm] | 22 | 20 | 19 | 17 | 16 | 15 |
| Polychloroprene solids content [%] | 33 | 31 | 29 | 27 | 26 | 24 |
| Solids content [%] | 55 | 55 | 54 | 54 | 54 | 54 |
| Viscosity [mPa * s] | 33 | 31 | 31 | 30 | 29 | 29 |
| HCl stability at 50 µS [min] | 442 | 425 | 402 | 434 | 376 | 422 |
| Contacting after 1-C spray [min] | 1 | 1 | (1) | 1 | 1 | (3) |
| Open time [min] | >10 | >10 | >10 | >10 | >10 | >10 |
| Heat distortion point ° C. | | | | 130 | | |

Analogously to silica with a solids content of 30% and a particle diameter of <10 nm, a silica with a solids content of 50% and a particle diameter of <50 nm can be successfully employed according to the invention. In this context, as is sometimes desired, the solids content of the formulation is not changed, but the solids content of the polymer component, without which the adhesive properties would deteriorate noticeably, does so up to a high dilution batch of approx. 100%. An outstanding heat distortion point of >130° C. is obtained.

TABLE 10

Influence of the dilution with Dispercoll ® S 5005 silica suspensions on the adhesive properties and heat distortion point

|  | 33* | 34 | 35 | 36 | 37 | 38 | 39 |
|---|---|---|---|---|---|---|---|
| Formulation composition [parts] | | | | | | | |
| Dispercoll ® C 84 [55%] | 100 | 100 | 100 | 100 | 100 | 100 | 100 |
| Rhenofit ® DDA-50 EM [50%] | 2.0 | 2.0 | 2.0 | 2.0 | 2.0 | 2.0 | 2.0 |
| Dispercoll ® S 5005 [50%] | 0 | 50 | 60 | 70 | 80 | 90 | 100 |
| Glycine powder [100%] | 4 | 10 | 10 | 10 | 10 | 10 | 10 |
| Results: | | | | | | | |
| pH | 9.0 | 9.0 | 9.0 | 9.0 | 9.0 | 9.0 | 9.0 |
| Residual monomer content [ppm] | 43 | 34 | 29 | 29 | 26 | 24 | 24 |
| Polychloroprene solids content [%] | 0.51 | 0.33 | 0.31 | 0.29 | 0.27 | 0.26 | 0.24 |
| Solids content [%] | 0.58 | 0.55 | 0.55 | 0.54 | 0.54 | 0.53 | 0.53 |
| Viscosity [mPa * s] | 65 | 43 | 27 | 30 | 24 | 29 | 25 |
| HCl stability at 50 µS [min] | 436 | 311 | 274 | 268 | 284 | 241 | 230 |
| Contacting after 1-C spray [min] | immediate | (immediate) | 1 | 1 | 1 | 1 | 1 |
| Open time [min] | >10 | >10 | >10 | >10 | >10 | >10 | >10 |

Analogously to the use of Dispercoll® C 2325, outstanding adhesive properties are achieved when Dispercoll® C 84 is employed and with the dilution according to the invention with silica suspensions.

A formulation according to the invention is present with approximately Newtonian shear properties, defined here as a change in the viscosity with the shear rate of 10/s-1,000/s of not more than 3.

TABLE 11

Comparison of polymer dispersions diluted according to the invention and undiluted, comparison with commercially available products.

|  | 40* | 41* | 42 | 43 | 44* | 45* | 46* | 47* |
|---|---|---|---|---|---|---|---|---|
| Formulation composition [parts] | | | | | | | | |
| Dispercoll ® C 84 [55%] | 100 | | 100 | | | | | |
| Dispercoll ® C VP LS 2325 [55%] | | 100 | | 100 | | | | 100 |
| C1 | | | | | 100 | | | |
| C2 | | | | | | 100 | | |
| C3 | | | | | | | 100 | |
| Completely demineralized water | | | 145 | 145 | | | | |
| Rhenofit DDA-50 EM [55%] | 2.0 | 2.0 | 2.0 | 2.0 | | | | 2 |
| Glycine powder [100%] | 4 | 6 | 4 | 6 | | | | 2.5 |
| ZnO Borcherts [25%] | | | | | | | | 1 |
| Plextol 4545 [50%] | | | | | | | | 25 |
| Results: | | | | | | | | |
| Viscosity [mPa * s] | 70 | 85 | 12 | 15 | 2000 | 470 | 1280 | 3660 |
| pH | 9.0 | 9.0 | 8.9 | 8.9 | 8.1 | 8.7 | 8.7 | 9.0 |
| Monomer content [ppm] | 36 | 32 | 20 | 17 | | | | 40 |
| Solids content [%] | 58 | 58 | 33 | 33 | 52 | 52 | 54 | 54 |
| Polychloroprene solids content [%] | 49 | 49 | 28 | 28 | >40 | >40 | >40 | 40 |
| ZnO content [% based on formulation] | 0 | 0 | 0 | 0 | | | | 0.5 |
| HCl stability at 50 μS [min] | 436 | 818 | 302 | 216 | 37 | 62 | 445 | 548 |
| Contacting after 1-C spray [min] | immediate | immediate | immediate | 1 | immediate | (2) | immediate | immediate |
| Open time [min] | >10 | >10 | >10 | >10 | >10 | >10 | >10 | >10 |
| Heat distortion point ° C. | 90 | 90 | | | 70 | 110 | 70 | 90 |

It can be seen that the formulation according to the invention produces bondabilities, with the properties according to the invention, comparable to those of commercially available formulations, in spite of a high dilution. They are moreover distinguished by an outstanding storage and HCl resistance and by extremely low viscosities.

The comparison examples which are not according to the invention in some cases show very low heat distortion points compared with Example 30 according to the invention.

Determination of the Rheological Properties

The samples were investigated with an MCR101 rheometer from Anton Paar.

The DG 26.7 cup/rotor system with the C-PTD200 Peltier heating was employed.

Measurement Profile: Section 1: Gradient log. from D=0.1-1,000 [1/s] at T=23° C.

Section 1: Gradient log. from D=1,000-0.1 [1/s] at T=23° C.

Results

TABLE 12

Viscosity as a function of the shear rate
Examples from Table 7, 11

| Example | Viscosity [Pa * a] shear rate [10/s] | Viscosity [Pa * s] shear rate [1,000/s] | Ratio |
|---|---|---|---|
| 14* | 0.1 | 0.0279 | 3.6 |
| 15 | 0.0029 | 0.0029 | 1 |
| 16 | 0.0065 | 0.0048 | 1.4 |
| 17 | 0.0028 | 0.0026 | 1.1 |
| 44* | 0.569 | 0.0566 | 10 |
| 45* | 0.297 | 0.0332 | 9 |

Shear Stability Studies

The test was conducted with a PHYSICA MC 200 rheometer with the Z3.1 measurement system (gap: 240 μm) at 25° C. The sample ran through a logarithmic shear gradient of from 0 to 15,000 s$^{-1}$ in 240 s.

For immediate determination of formations of coagulate at a particular shear rate, a very short measurement interval of 0.1 s was set, and the measurement is interrupted automatically at an increase of delta 1,000 Pa between two measurement points. If still no formation of coagulate was found in a sample, it was exposed further to shear forces at the maximum shear rate of 15,000 s$^{-1}$ over a period of 600 s with a measurement cycle of 1 s.

TABLE 13

Shear rates

| Sample | Shear rate reaches 15,000 1/s | Running time after reaching the shear rate of 15,000 1/s [min] |
|---|---|---|
| 44* | yes | 5.5 |
| 45* | interruption at 11,400 s$^{-1}$ | — |
| 7 | yes | 10 |
| 47* | interruption at 261 s$^{-1}$ | — |
| 46* | yes | 10 |

Three of the four comparison examples of commercially available products show a significant shear instability, which can be seen from the increasing viscosity (coagulation) when a shear rate of approx. 260 1/s or 11,400 1/s is reached or a premature coagulation before the end of the measurement time at the highest shear rate. Only Example 7 according to the invention and Comparison Example 46* show no coagulation, Comparison Example 46* losing viscosity significantly in the course of the measurement and its rheological properties thus changing markedly.

Spray Tests with the Wagner Spray Gun Under Pressures of <<0.5 Bar, See Wagner W550 Operating Instructions.

Commercially available 1-C spray adhesive formulations and formulations according to the invention are to be tested with the commercially available application system of Wagner.

Comparison Examples 44*, 45*, 46*, 47* and Example 15 according to the invention were investigated.

While Example 15 according to the invention can be sprayed without problems and after application to PU foam has the usual adhesive properties of standard medium pressure systems (see Table 7), Comparison Examples 44*, 46* and 47* cannot be sprayed because of the high viscosities, and Comparison Example 45* blocks the nozzle of the spray applicator after a short time.

Rebonding.

After drying off, due to their thin application layers, the products according to the invention show an outstanding rebondability after renewed application of adhesive. For this, Example 15 according to the invention was applied to PU foam by means of spray application, dried off for 2 h, and applied again to the same test component. Successful contacting was achieved after <1 minute.

Resistance to Low Temperatures:

After cooling to 0° C. by means of an ice-bath, Example 42 according to the invention was applied to PU foam by spraying as described generally under 7. Contacting was to be achieved after a waiting time of <2 minutes, and the viscosity rose by 2 mPas, while the viscosity in Comparison Examples 44*, 45*, 46* and 47*, which are not according to the invention, rose by 910 mPas, 176 mPas, 310 mPas and 1,730 mPas respectively. Given these considerable increases in the viscosity, usability in a spray application under fixed process settings is no longer guaranteed.

In Example 7 according to the invention, complete retention of the resistance to shear under shear forces at 0° C. was furthermore to be found, compared with Examples 44*, 46*, 47*, which are not according to the invention, as described in Table 14 analogously to the test series of Table 13, although measured at 0° C., which record significant losses in shear stability. Retention of the shear stability is important, so that at low temperatures during the spray application no premature coagulation in the spray head, which causes additional cleaning cycles and therefore considerable losses in productivity, takes place.

TABLE 14

| Sample | Shear rate reaches 15,000 1/s | Running time after reaching the shear rate of 15,000 1/s [min] |
|---|---|---|
| 44* | yes | 3.5 |
| 7 | yes | 10 |
| 47* | no | — |
| 46* | yes | 1.5 |

Storage Stability:

The examples according to the invention are distinguished by an outstanding storage stability. Even after storage for up to 10 days at 70° C., in contrast to standard lattices and commercially available adhesive formulations, only slight changes in the pH of <1 unit and changes in the viscosity of <20 mPas, while retaining function in spray bonding of foams, were observed, see Table 15.

To test the storage stability, in each case 10 glass bottles of 100 ml were filled as close to the top as possible, in order to minimize any skin formation in the bottles, with Formulation 7 according to the invention and, as a comparison, Dispercoll C84 (55%) latex and Dispercoll C84 latex diluted to 28%. The samples are then stored in a drying cabinet at 70° C., and a sample is taken daily and investigated for deposits, pH, viscosity and retention of the suitability for spray application for bonding foams, as described in Test Method 7.

TABLE 15

Ageing in a drying cabinet at 70° C.

| | Ageing at 70° C. in a drying cabinet [days] | | |
|---|---|---|---|
| | 0 | 1 | 10 |
| Dispercoll C 84 (55%) | | | |
| pH | 12.0 | 9.8 | 9.7 |
| Viscosity [mPa * s] | 115 | 78 | 50 |
| Sediment caking | no | yes | yes |
| Dispercoll C 84 diluted (28%) | | | |
| pH | 11.9 | 9.6 | 9.0 |
| Viscosity [mPa * s] | 3 | 4 | 11 |
| Sediment caking | no | no | no |
| Example 7 according to the invention | | | |
| pH | 8.9 | 8.79 | 8.44 |
| Viscosity [mPa*] | 11 | 10 | 8 |
| Sediment caking | no | no | no |

Contactability on PU Foam [min]

| Example 7 | immediate | 1 | 3 | 5 | 10 |
|---|---|---|---|---|---|
| 0 d 70° C. | + | + | + | + | + |
| 10 d 70° C. | − | + | + | + | + |

Explanation:
− completely open
+ completely closed
(+) slightly open

Example D, Alternative Preparation Process:

Deviating from the batch process described in Example C, the examples according to the invention can alternatively be prepared by simultaneously bringing together the components by means of a static mixer or dynamic mixer. If required, in deviation from the simultaneous bringing together within the static mixer or dynamic mixer, individual components can be mixed in with a slight time lag through inflow openings. Finished product emerges at the end of the static mixer/dynamic mixer. The mixing times in this context are <1 hour. The products obtained do not differ from those products according to the invention prepared by the batch procedure.

The use of the mixing process described is advantageous for the examples according to the invention because these are distinguished by an outstanding shear stability and storage stability and in this way no batch mixing units have to be kept in reserve, but the preparation can be carried out directly from the delivery drums by means of metering pumps. This relationship does not necessarily exist for the examples which are not according to the invention, because of the sometimes significantly lower shear stabilities and higher viscosities.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. An aqueous polymer dispersion comprising a concentration of polychloroprene of less than or equal to 40 weight % and a residual monomer content of less than 50 ppm, wherein said aqueous polymer dispersion has a viscosity of less than 50 mPas, a pH stability of greater than 2 hours, and the viscosity of said aqueous dispersion changes by a factor of less than or equal to 3 over the range of from 10 to 1,000 /s.

2. The aqueous polymer dispersion of claim 1, further comprising a total emulsifier concentration of less than 1.5 weight %.

3. The aqueous polymer dispersion of claim 1, further comprising from 0.1 to 5 parts by weight of ageing/oxidation stabilizers, based on a solids concentration of polychloroprene of 100 parts.

4. The aqueous polymer dispersion of claim 1, wherein said aqueous polymer dispersion has a Zn concentration of less than 0.24 weight %.

5. The aqueous polymer dispersion of claim 1, wherein said aqueous polymer dispersion has a pH of 8 to 10.

6. The aqueous polymer dispersion of claim 1, further comprising 40 to 100 parts by weight of silica/water-glass as a suspension of discrete particles in water, wherein the solids content of the silica suspension is used to calculate the parts and the polychloroprene solids content of a polychloroprene latex is set at 100 parts.

7. The aqueous polymer dispersion of claim 6, wherein said silicas are aqueous silicon dioxide dispersions, the $SiO_2$ particles of which have a primary particle size of from 1 to 400 nm.

8. A process for preparing the aqueous polymer dispersion of claim 1, comprising
a) continuously or discontinuously (co)polymerizing chloroprene in an aqueous emulsion, optionally with a defined amount of a regulator to form an aqueous polymer dispersion;
b) removing residual monomers from said aqueous polymer dispersion down to a value of less than 50 ppm;
c) optionally diluting said aqueous polymer dispersion with water; and
d) optionally storing said aqueous polymer dispersion under temperature-controlled conditions and/or concentrating and optionally subsequently diluting said aqueous polymer dispersion with water.

9. The process of claim 8, wherein a) is carried out with 0 to 20 parts by weight, based on 100 parts by weight of chloroprene, of copolymerizable ethylenically unsaturated monomers in the presence of 0 to 1 mmol of a regulator, based on 100 g of monomer, at temperatures of 0 to 70 ° C. in said aqueous emulsion, the resulting aqueous polymer dispersion having a content which is insoluble in organic solvents of 0.1 to 90 weight %, based on the polymer.

10. The process of claim 8, wherein a) is performed as a batch process or as a continuous process.

11. The process of claim 10, wherein constituents are added in succession, simultaneously by means of static mixers/dynamic mixers, or combinations thereof, wherein the mixing times are less than 1 hour.

12. An adhesive composition comprising the aqueous polymer dispersion of claim 1.

13. The adhesive composition of claim 12, wherein said adhesive composition is applied by brush, roller, spray, or mist.

14. A substrate coated with the adhesive composition of claim 12.

15. A process for producing a wet-in-wet bond on foams, comprising (1) applying the adhesive composition of claim 12 to a substrate by means of spray, brush, or roller application and (2) generating a wet bond before film formation after an air-drying time of less than 5 minutes.

16. A process for producing a wet-in-wet bond on foams, comprising (1) applying the adhesive composition of claim 12 to less than 75 g/m², based on polychloroprene, on a substrate surface by means of spray, brush, or roller application and (2) generating a wet bond before film formation after an air-drying time of no less than 5 minutes and prolonging the contact time to more than 5 min without a loss of function.

17. The process of claim 15, wherein (1) is achieved by conventional medium pressure spray application in the range of from 0.5 to 6 bar.

18. A process for producing composite materials, comprising bonding joint components with an adhesive composition comprising the aqueous polymer dispersion of claim 1.

19. A foam bond in mattress and furniture/upholstery comprising the aqueous polymer dispersion of claim 1.

20. A bonded substrate comprising the aqueous polymer dispersion of claim 1, wherein said bonded substrate is selected from the group consisting of wood, thermoplastics, elastomers, thermoplastic elastomers, vulcanisates, textile woven fabrics, knitted fabrics, braided fabrics, metals, and stoneware, which have been concreted with one another and/or on to porous substrates having a density of less than 1 kg/liter.

* * * * *